United States Patent
Benny et al.

(10) Patent No.: US 9,602,400 B2
(45) Date of Patent: *Mar. 21, 2017

(54) HYPERVISOR INDEPENDENT NETWORK VIRTUALIZATION

(71) Applicant: International Business Machines Corporation, Armonk, NY (US)

(72) Inventors: Stephan Benny, Santa Clara, CA (US); Jayakrishna Kidambi, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,594

(22) Filed: Jan. 4, 2016

(65) Prior Publication Data

US 2016/0119230 A1 Apr. 28, 2016

Related U.S. Application Data

(63) Continuation of application No. 14/066,492, filed on Oct. 29, 2013, now Pat. No. 9,264,352, which is a
(Continued)

(51) Int. Cl.
*H04L 12/28* (2006.01)
*H04L 12/56* (2006.01)
(Continued)

(52) U.S. Cl.
CPC .......... *H04L 45/64* (2013.01); *H04L 12/4633* (2013.01); *H04L 12/4645* (2013.01); *H04L 49/70* (2013.01); *H04L 45/04* (2013.01)

(58) Field of Classification Search
None
See application file for complete search history.

(56) References Cited

U.S. PATENT DOCUMENTS

| 7,047,314 B2 | 5/2006 | Sato et al. |
| 7,508,775 B2 | 3/2009 | Ackermann-Markes et al. |

(Continued)

FOREIGN PATENT DOCUMENTS

| CN | 102801599 A | 11/2012 |
| JP | 2013003935 A | 1/2013 |
| WO | 2012166139 A1 | 12/2012 |

OTHER PUBLICATIONS

Non-Final Office Action from U.S. Appl. No. 14/066,492, dated May 6, 2015.
(Continued)

*Primary Examiner* — Edan Orgad
*Assistant Examiner* — Rebecca Song
(74) *Attorney, Agent, or Firm* — Zilka-Kotab, PC

(57) ABSTRACT

A method includes receiving a first packet having a first virtual local area network (VLAN) identifier (ID) directly from a first virtual switch using a first physical overlay switch located at an edge of an internet protocol (IP) network, encapsulating the first packet with an overlay header and tunneling the first encapsulated packet via Layer-3 operations across the IP network to a second physical overlay switch in response to a determination that a source of the packet is physically separated from a destination of the packet by the IP network, receiving a second encapsulated packet having a second overlay header from the second physical overlay switch, de-encapsulating the second encapsulated packet to create a second packet having a second VLAN ID, and sending the second packet having the second VLAN ID directly to the first virtual switch operating in the first hypervisor domain.

18 Claims, 7 Drawing Sheets

Related U.S. Application Data continuation of application No. 13/528,751, filed on Jun. 20, 2012, now Pat. No. 8,942,237.

(51) Int. Cl.
*H04L 12/715* (2013.01)
*H04L 12/46* (2006.01)
*H04L 12/931* (2013.01)

(56) References Cited

U.S. PATENT DOCUMENTS

| | | |
|---|---|---|
| 7,693,158 B1 | 4/2010 | Carrie |
| 7,860,092 B2 | 12/2010 | Yoon et al. |
| 7,983,257 B2 | 7/2011 | Chavan et al. |
| 7,986,649 B2 | 7/2011 | Zheng |
| 8,590,005 B2 | 11/2013 | Payne, Jr. et al. |
| 8,942,237 B2 | 1/2015 | Benny et al. |
| 9,116,727 B2 | 8/2015 | Benny et al. |
| 9,264,352 B2 | 2/2016 | Benny et al. |
| 2005/0182853 A1 | 8/2005 | Lewites et al. |
| 2008/0205264 A1 | 8/2008 | Rorie |
| 2008/0253373 A1 | 10/2008 | Ros-Giralt et al. |
| 2009/0037607 A1 | 2/2009 | Farinacci et al. |
| 2010/0061385 A1 | 3/2010 | Welin et al. |
| 2010/0088496 A1 | 4/2010 | Zolnowsky et al. |
| 2010/0226368 A1 | 9/2010 | Mack-Crane et al. |
| 2010/0250914 A1* | 9/2010 | Abdul ............... G06F 1/3209 713/100 |
| 2011/0202920 A1 | 8/2011 | Takase |
| 2011/0299531 A1 | 12/2011 | Yu et al. |
| 2011/0299534 A1 | 12/2011 | Koganti et al. |
| 2011/0317703 A1 | 12/2011 | Dunbar et al. |
| 2012/0014386 A1 | 1/2012 | Xiong et al. |
| 2012/0014387 A1* | 1/2012 | Dunbar ............ H04L 12/4625 370/395.53 |
| 2012/0016970 A1 | 1/2012 | Shah et al. |
| 2012/0307826 A1 | 12/2012 | Matsuoka |
| 2013/0163594 A1 | 6/2013 | Sharma et al. |
| 2013/0238802 A1 | 9/2013 | Sarikaya |
| 2013/0250951 A1 | 9/2013 | Koganti |
| 2013/0318219 A1 | 11/2013 | Kancherla |
| 2013/0322443 A1* | 12/2013 | Dunbar ............... H04L 12/185 370/390 |
| 2013/0343385 A1 | 12/2013 | Benny et al. |
| 2013/0346583 A1 | 12/2013 | Low et al. |
| 2014/0025821 A1 | 1/2014 | Baphna et al. |
| 2014/0056302 A1 | 2/2014 | Benny et al. |
| 2014/0098813 A1 | 4/2014 | Mishra et al. |
| 2014/0185616 A1 | 7/2014 | Bloch et al. |
| 2014/0192804 A1 | 7/2014 | Ghanwani et al. |
| 2014/0201733 A1 | 7/2014 | Benny et al. |
| 2015/0143369 A1 | 5/2015 | Zheng et al. |

OTHER PUBLICATIONS

Notice of Allowance from U.S. Appl. No. 13/742,274, dated Apr. 21, 2015.
International Search Report and Written Opinion from International Application No. PCT/IB2013/060812, dated May 16, 2014.
Li et al., "VSITE: A Scalable and Secure Architecture for Seamless L2 Enterprise Extension in the Cloud," Secure Network Protocols (NPSec), 2010 6th IEEE Workshop, Oct. 5, 2010, pp. 31-36.
Benny et al., U.S. Appl. No. 13/742,274, filed Jan. 15, 2013.
Non-Final Office Action from U.S. Appl. No. 13/742,274, dated Nov. 6, 2014.
Benny et al., U.S. Appl. No. 13/528,751, filed Jun. 20, 2012.
Non-Final Office Action from U.S. Appl. No. 13/528,751, dated Nov. 22, 2013.
Final Office Action from U.S. Appl. No. 13/528,751, dated May 14, 2014.
Notice of Allowance from U.S. Appl. No. 13/528,751, dated Sep. 17, 2014.
Benny et al., U.S. Appl. No. 14/066,492, filed Oct. 29, 2013.
Notice of Allowance from U.S. Appl. No. 14/066,492, dated Sep. 30, 2015.
Supplemental Notice of Allowance from U.S. Appl. No. 13/742,274, dated May 21, 2015.
Supplemental Notice of Allowance from U.S. Appl. No. 13/742,274, dated Jul. 8, 2015.

* cited by examiner

HYPERVISOR INDEPENDENT NETWORK VIRTUALIZATION

BACKGROUND

The present invention relates to data center infrastructure, and more particularly, this invention relates to providing a virtualized network independent of hypervisors used to provide the virtualized network.

Network virtualization is an emerging data center and cloud computing trend which aims to virtualize a network as seen by end stations in a way that greatly simplifies network provisioning in multi-tenant environments, as well as traditional environments. One of the more common techniques of achieving network virtualization is to use network overlays, where virtual tunnels are established between edge network switches to which end stations connect. The tunnel is actually implemented by encapsulating packets emitted by a source end station in an overlay header that transports the packet from the source switch to a target switch via an internet protocol (IP)-based network. The overlay header includes an identifier (ID) that uniquely identifies the virtual network. The target switch strips off the overlay header encapsulation and delivers the original packet to the destination end station. In addition to this tunneling mechanism, the edge switches participate in an address discovery protocol, which may be learning/flooding based, or lookup-based.

One conventionally used solution to providing the address discovery protocol involves performing the functionality described above at the so-called virtual switches, which are actually software entities that reside within Hypervisors. Virtual switches connect multiple virtual end stations, e.g., Virtual Machines (VMs), to each other and to the physical network.

The drawback of virtual switch-based solutions is that virtual switch software for multiple Hypervisors (e.g., ESX, Hyper-V, Xen, KVM, etc.) from multiple vendors (e.g., VMware, Microsoft, Citrix, RedHat, etc.) need to be updated individually, which is cumbersome and non-uniform in its execution. Accordingly, a solution that is capable of providing the address discovery protocol that is Hypervisor-agnostic and requires no updates to virtual switches would be very appealing to continue to expand and grow the use of virtual overlay networks in data centers.

SUMMARY

In one embodiment, a method includes receiving a first packet having a first virtual local area network (VLAN) identifier (ID) directly from a first virtual switch operating in a first hypervisor domain using a first physical overlay switch located at an edge of an internet protocol (IP) network. The method also includes encapsulating the first packet with an overlay header and tunneling the first encapsulated packet via Layer-3 operations across the IP network to a second physical overlay switch in response to a determination that a source of the packet is physically separated from a destination of the packet by the IP network, the second physical overlay switch being connected to one or more second virtual switches operating in a second hypervisor domain. Moreover, the method includes receiving a second encapsulated packet having a second overlay header from the second physical overlay switch. In addition, the method includes de-encapsulating the second encapsulated packet to create a second packet having a second VLAN ID. Also, the method includes sending the second packet having the second VLAN ID directly to the first virtual switch operating in the first hypervisor domain.

In accordance with another embodiment, a method includes a first virtual switch sending a first packet having a first VLAN ID directly to a first physical overlay switch located at an edge of an IP network, the first virtual switch operating in a first hypervisor domain. The method also includes the first virtual switch receiving a second packet having a second VLAN ID from the first physical overlay switch. Moreover, the method includes the first virtual switch removing the second VLAN ID from the second packet. Also, the method includes the first virtual switch switching the second packet to a destination port designated in the second packet.

In yet another embodiment, a computer program product includes a computer readable storage medium having program instructions embodied therewith. The computer readable storage medium is not a transitory signal per se. Also, the embedded program instructions are readable/executable by a processor of a first physical overlay switch to receive, by the processor, a first packet having a first VLAN ID directly from a first virtual switch operating in a first hypervisor domain, the first physical overlay switch being located at an edge of an internet protocol (IP) network. The embedded program instructions are also readable/executable by the processor to encapsulate, by the processor, the first packet with an overlay header, and tunnel, by the processor, the first encapsulated packet via Layer-3 operations across the IP network to a second physical overlay switch in response to a determination that a source of the packet is physically separated from a destination of the packet by the IP network, the second physical overlay switch being connected to one or more second virtual switches operating in a second hypervisor domain. Moreover, the embedded program instructions are readable/executable by the processor to receive, by the processor, a second encapsulated packet having a second overlay header from the second physical overlay switch. In addition, the embedded program instructions are readable/executable by the processor to de-encapsulate, by the processor, the second encapsulated packet to create a second packet having a second VLAN ID. The embedded program instructions are also readable/executable by the processor to send, by the processor, the second packet having the second VLAN ID directly to the first virtual switch operating in the first hypervisor domain.

Other aspects and embodiments of the present invention will become apparent from the following detailed description, which, when taken in conjunction with the drawings, illustrate by way of example the principles of the invention.

DETAILED DESCRIPTION

Figure 1:
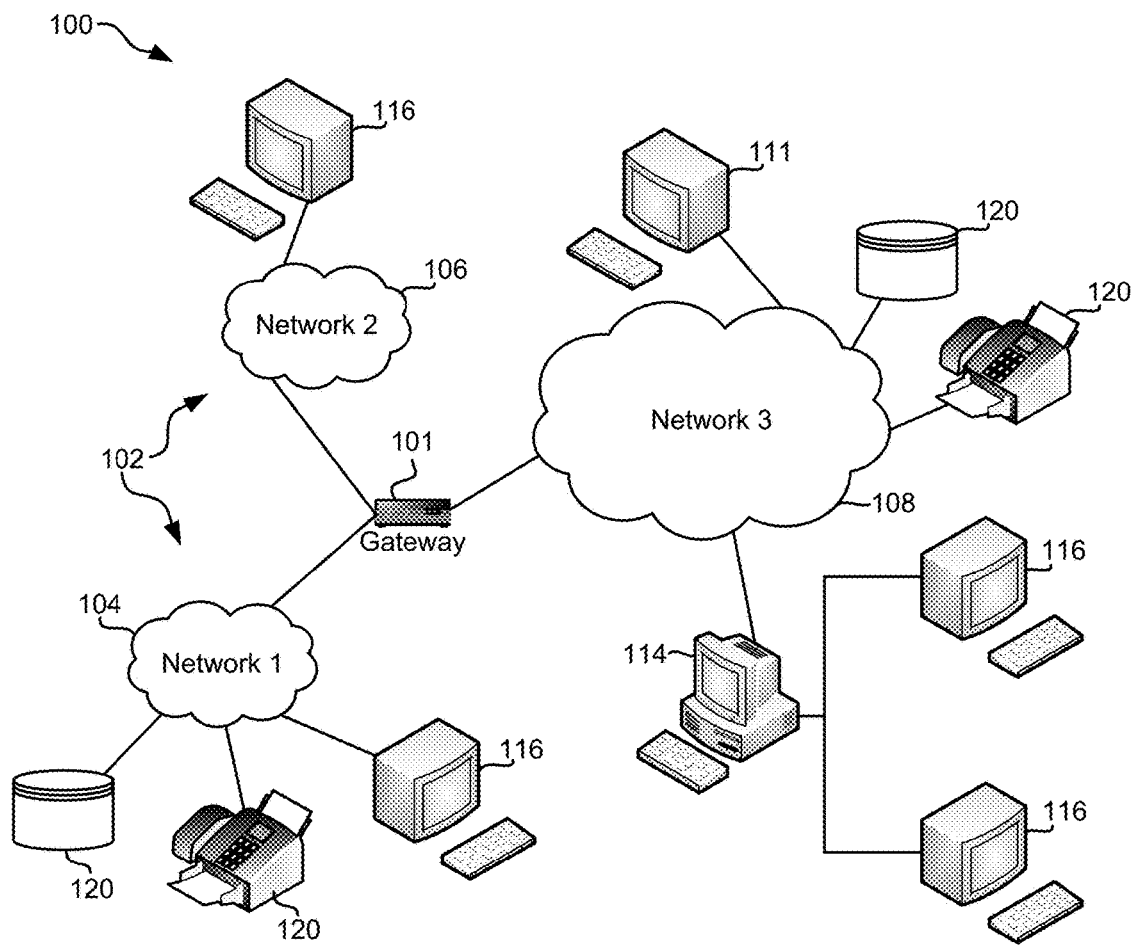
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, overlay operations for virtual overlay networks may be provided at physical edge switches of a physical network to which virtual switches connect.

In one general embodiment, a system includes a first physical overlay switch located at an edge of an internet protocol (IP) network, the first physical overlay switch including logic adapted for receiving a packet having a virtual local area network (VLAN) identifier (ID) from a virtual switch, logic adapted for encapsulating the packet with an overlay header, logic adapted for tunneling the encapsulated packet via the IP network to a second physical overlay switch, logic adapted for receiving a second encapsulated packet having a second overlay header from the second physical overlay switch, logic adapted for de-encapsulating the second encapsulated packet to create a second packet having a second VLAN ID, and logic adapted for sending the second packet having the second VLAN ID to the virtual switch.

In another general embodiment, a computer program product for providing a virtual overlay network includes a computer readable storage medium having computer readable program code embodied therewith, the computer readable program code including computer readable program code configured for receiving a packet having a VLAN ID at a first physical overlay switch located at an edge of an IP network, computer readable program code configured for encapsulating the packet with an overlay header using the first physical overlay switch, and computer readable program code configured for tunneling the encapsulated packet to a second physical overlay switch via the IP network.

In yet another general embodiment, a method for providing a virtual overlay network includes receiving a packet having a VLAN ID at a first physical overlay switch located at an edge of an IP network, encapsulating the packet with an overlay header using the first physical overlay switch, and tunneling the encapsulated packet to a second physical overlay switch via the IP network.

According to another general embodiment, a system includes a first physical overlay switch located at an edge of an IP network, the first physical overlay switch coupled to one or more first virtual switches and a second physical overlay switch located at the edge of the IP network, the second physical overlay switch coupled to one or more second virtual switches, wherein the first physical overlay switch includes logic adapted for receiving a first packet having a first VLAN ID from one of the one or more first virtual switches, logic adapted for encapsulating the first packet with an overlay header, logic adapted for tunneling the first encapsulated packet via the IP network to the second physical overlay switch, logic adapted for receiving a second encapsulated packet having a second overlay header from the second physical overlay switch, logic adapted for de-encapsulating the second encapsulated packet to create a second packet having a second VLAN ID, and logic adapted for sending the second packet having the second VLAN ID to one of the one or more first virtual switches, wherein the second physical overlay switch includes logic adapted for receiving the second packet having the second VLAN ID from one of the one or more second virtual switches, logic adapted for encapsulating the second packet with a second overlay header, logic adapted for tunneling the second encapsulated packet via the IP network to the first physical overlay switch, logic adapted for receiving the first encapsulated packet having the first overlay header from the first physical overlay switch, logic adapted for de-encapsulating the first encapsulated packet to create the first packet having the first VLAN ID, and logic adapted for sending the first packet having the first VLAN ID to one of the one or more second virtual switches.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
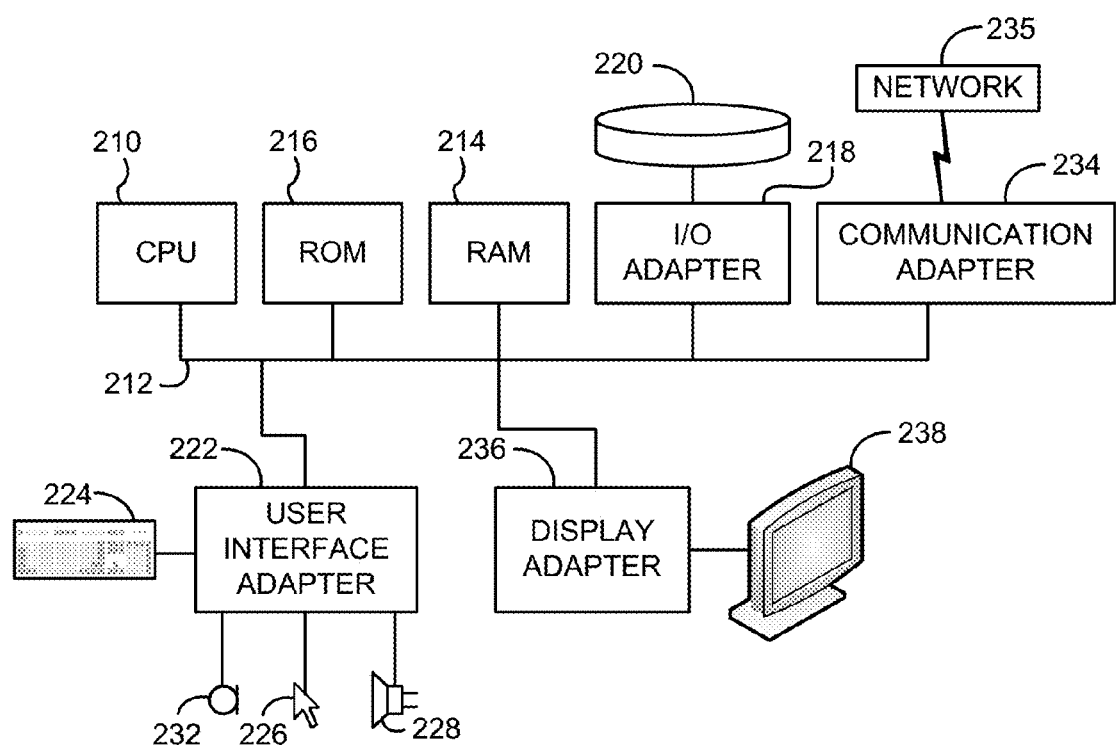
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments. Other types of processors may also be used, such as an integrated circuit (IC), an application specific integrated circuit (ASIC), a field programmable gate array (FPGA), or any other type of processor known in the art.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
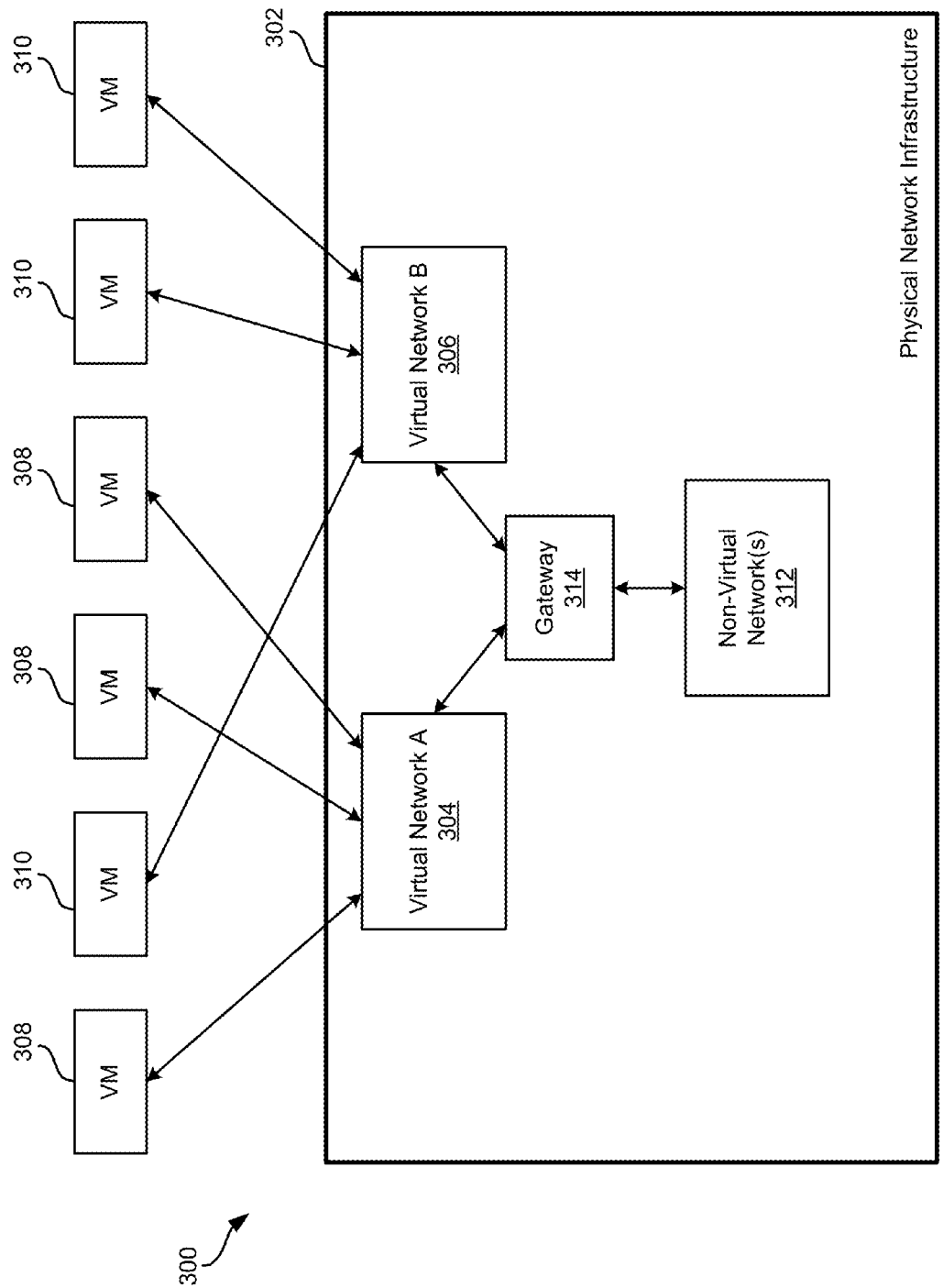
FIG. 3 is a conceptual view of an overlay network, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across layer 3-domains, between one subnet to another subnet, IP subnet to IP subnet, etc. But if it the architecture is similar to a large flat switch, in a very large layer 2-domain, then the VMs are aided in their attempt to move data across the architecture.

Figure 4:
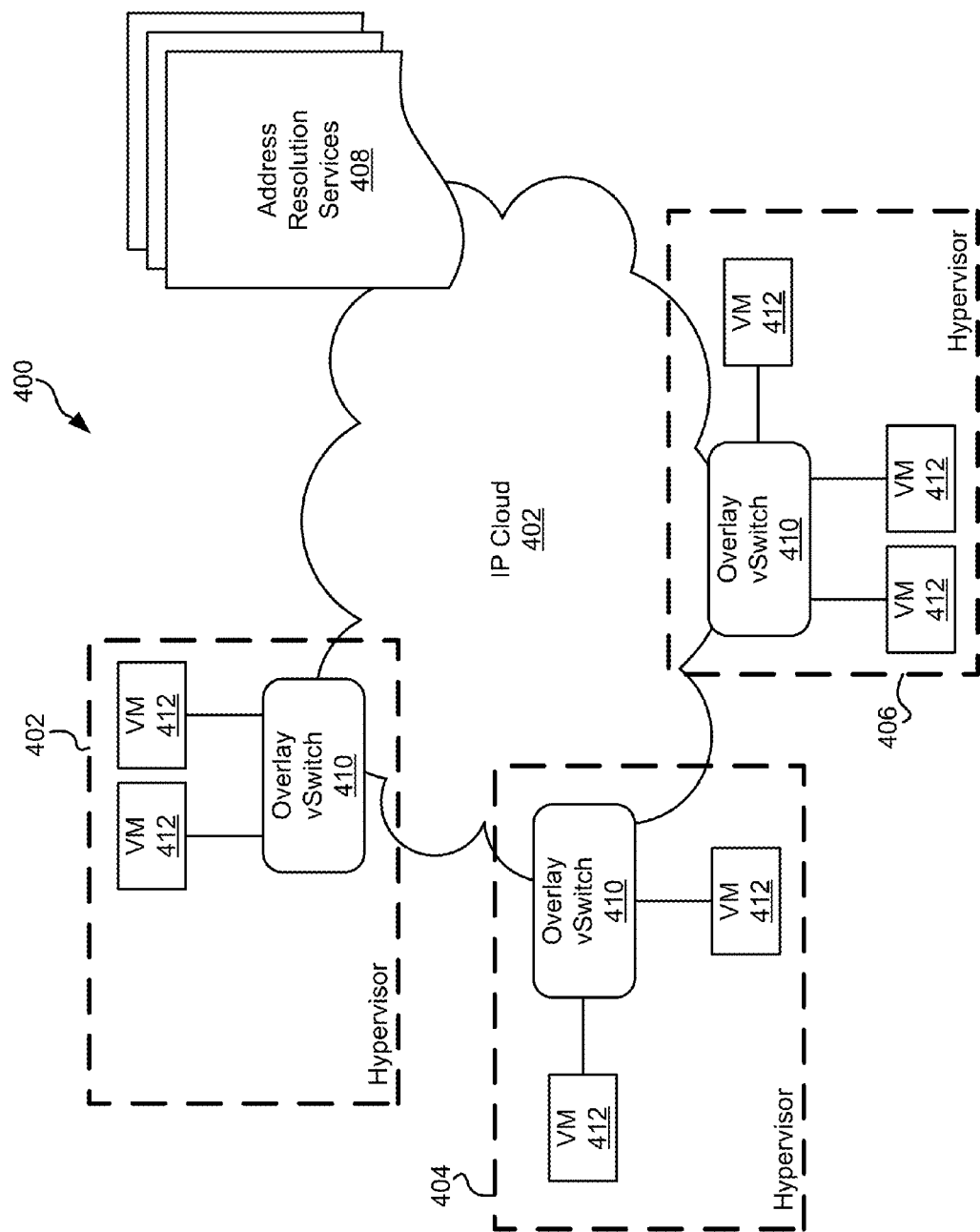
FIG. 4 shows a system architecture, according to the prior art.

FIG. 4 shows a system architecture 400 according to the prior art. This system architecture 400 is reliant on the type of Hypervisors used when updates are to be made across Hypervisor domains. As shown, a plurality of Overlay virtual switches (vSwitches) 410 may exist in the system 400, with each Overlay vSwitch 410 being connected to one or more end stations or virtual machines (VMs) 412. The Overlay vSwitches 410 communicate across an infrastructure common to most data centers that provides IP communication capabilities, referred to herein as an internet protocol (IP) cloud 402, which may include any components known in the art for providing communications across and/or via one or more IP networks.

Each of the Overlay vSwitches 410 along with their corresponding VMs 412 are controlled by a Hypervisor 402, 404, 406. Each of the Hypervisors 402, 404, 406 may be from a different provider and may be of a different type. Even if they are not different types, they still need to be updated independently, which is troublesome in most systems. This requires that different address resolution services 408 are applied to the IP cloud 402 in order for the updates to be performed on all the different Hypervisors 402, 404, 406.

A problem arises with conventional architectures when there is multi-tenancy that occupies VMs 412 across multiple Overlay vSwitches 410. For example, assume that a single user (tenant 1) uses VMs 412 in both Hypervisor 402 and Hypervisor 404. Also assume that a second user (tenant 2) uses VMs 412 in Hypervisor 404 and 406. In this example, there is multi-tenancy in Hypervisor 404. Accordingly, it is imperative that the resources in Hypervisor 404 are segregated or isolated between the two tenants, and that security is provided so that tenant 1 does not have access to data traffic intended for tenant 2, and vice versa. Conventionally VLANs have been used to provide for this type of segregation. However, VLANs do not scale well, since VLANs have a VLAN ID limit of 12 bits, which results in only about 4000 such IDs being available for each VLAN, as $2^{12}-1=4095$. For tenants demanding large amounts of resources, this number of VLAN IDs may be depleted quickly, resulting in a poor solution.

Another problem with using VLANs to segregate the resources between multiple tenants is that if the common infrastructure (the IP Cloud 402) is being used, then it must be provisioned for those VLANs. Therefore, if any changes take place, which will happen frequently for an active tenant, and new machines are put online, especially with VMs that may move dynamically from one place to another, provisioning of the VLANs also becomes a problem.

An overlay network solution allows for independence from VLANs, in that there is no need to associate a given set of VMs within the VLANs and then make sure that wherever they show up that VLAN is provisioned end to end, and all of those problems are gone.

Figure 5:
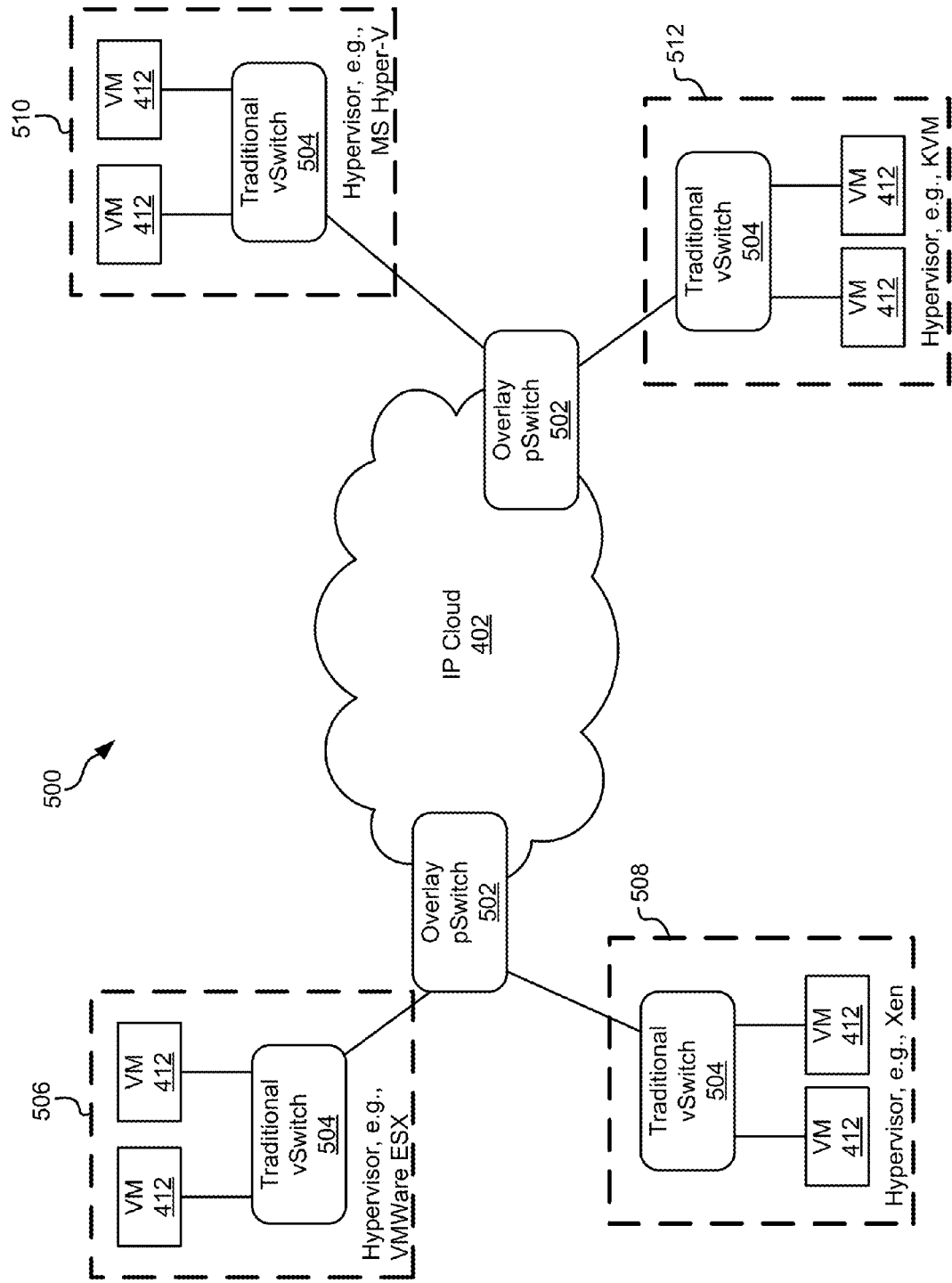
FIG. 5 a system architecture is shown according to one embodiment.

Now referring to FIG. 5, a system architecture 500 is shown according to one embodiment. Overlay operations may be provided by a physical switch (Overlay pSwitch 502) at the edge of the IP cloud 402 infrastructure, to which virtual switches (Traditional vSwitch 504) connect. The vSwitches 504 may belong to any Hypervisor, for example FIG. 5 is shown with VMWare® ESX® 506, Xen Project® 508, Microsoft® Hyper-V® 510, and KVM 512, but any Hypervisors may be used, different or the same. In addition, the vSwitches 504 do not require nor are they provided with any knowledge of the overlay operations that the Overlay pSwitches 502 perform. According to one embodiment, the vSwitches 504 may support VLANs, which is fairly standard for virtual switch implementations typically used currently. This allows for network virtualization to be provided in a Hypervisor-agnostic, uniform manner across the entire system 500.

In one approach, mixed environments of different Hypervisors may be supported, as shown in FIG. 5, and even non-virtualized physical machines may be used (not shown), which is not possible using vSwitch-based techniques as shown in FIG. 4. Another advantage to the hardware-based implementation shown in FIG. 5 is that processor cycles on the various Hypervisors 506, 508, 510, 512 may be reduced, and better performance may be achieved in response to this improvement due to hardware acceleration provided by networking ASICs.

According to another approach, the Overlay pSwitches 502 may be implemented by leveraging a new feature to bridge legacy networks with virtual overlay networks. This feature may be utilized in a manner not foreseen by others, e.g., in a completely new way. Instead of having the overlay-traditional bridging functionality provided by a vSwitch by connecting a VLAN to a traditional physical network as in conventional systems, the VLAN is connected to a vSwitch according to various embodiments. In conventional systems, the vSwitch continues to provide the overlay functionality. According to various embodiments described herein, the vSwitch is an unmodified, traditional vSwitch that doesn't have any new functionality or requirements (such as providing overlay functionality). This is a unique twist that provides a powerful solution with a simplified execution.

In accordance with one embodiment, a system 500 includes a first physical overlay switch 502 (on the left side of the figure) located at an edge of an IP network 402, the first physical overlay switch 502 being coupled to one or more first virtual switches 504 (in Hypervisors 506, 508, etc.). The system 500 also includes a second physical overlay switch 502 (on the right side of the figure) located at the edge of the IP network 402, the second physical overlay switch 502 coupled to one or more second virtual switches 504 (in Hypervisors 510, 512, etc.).

The first physical overlay switch may comprise some or all of the following logic, as either hardware or software, or a combination of hardware and software. The logic that may be present is logic adapted for receiving a first packet having a first VLAN ID from one of the one or more first virtual switches, logic adapted for encapsulating the first packet with an overlay header, logic adapted for tunneling the first encapsulated packet via the IP network to the second physical overlay switch, logic adapted for receiving a second encapsulated packet having a second overlay header from the second physical overlay switch, logic adapted for de-encapsulating the second encapsulated packet to create a second packet having a second VLAN ID, and logic adapted for sending the second packet having the second VLAN ID to one of the one or more first virtual switches.

The second physical overlay switch may comprise some or all of the following logic, as either hardware or software, or a combination of hardware and software. The logic that may be present is logic adapted for receiving the second packet having the second VLAN ID from one of the one or more second virtual switches, logic adapted for encapsulating the second packet with a second overlay header, logic adapted for tunneling the second encapsulated packet via the IP network to the first physical overlay switch, logic adapted for receiving the first encapsulated packet having the first overlay header from the first physical overlay switch, logic adapted for de-encapsulating the first encapsulated packet to create the first packet having the first VLAN ID, and logic adapted for sending the first packet having the first VLAN ID to one of the one or more second virtual switches.

In some further approaches, the system 500 may include the first and second virtual switches. Each of the one or more first virtual switches may comprise some or all of the following logic, as either hardware, software or a combination: logic adapted for receiving the second packet having the second VLAN ID from the first physical overlay switch, logic adapted for removing the second VLAN ID to create the second packet, logic adapted for switching the second packet to a destination port designated in the second packet, logic adapted for receiving the first packet from a first source device, logic adapted for encapsulating the first packet with the first VLAN ID, and logic adapted for switching the first packet having the first VLAN ID to the first physical overlay switch.

Furthermore, in some approaches, each of the one or more second virtual switches may comprise some or all of the following logic, as either hardware, software or a combination: logic adapted for receiving the first packet having the first VLAN ID from the second physical overlay switch, logic adapted for removing the first VLAN ID to create the first packet, logic adapted for switching the first packet to a destination port designated in the first packet, logic adapted for receiving the second packet from a second source device, logic adapted for encapsulating the second packet with the second VLAN ID, and logic adapted for switching the second packet having the second VLAN ID to the second physical overlay switch.

In more approaches, the first and second physical overlay switches may be top of rack switches, embedded blade switches, or a combination thereof, as understood in the art.

In other embodiments, the first VLAN ID may be used by the first physical overlay switch to create the first overlay header, the second overlay header may be used by the first physical overlay switch to create the second VLAN ID, the second VLAN ID may be used by the second physical overlay switch to create the second overlay header, and/or the first overlay header may be used by the second physical overlay switch to create the first VLAN ID.

In any approach, the first and second virtual switches may be controlled by different hypervisors, e.g., Hypervisors from different vendors, using different coding, having different functionality, etc.

Figure 6:
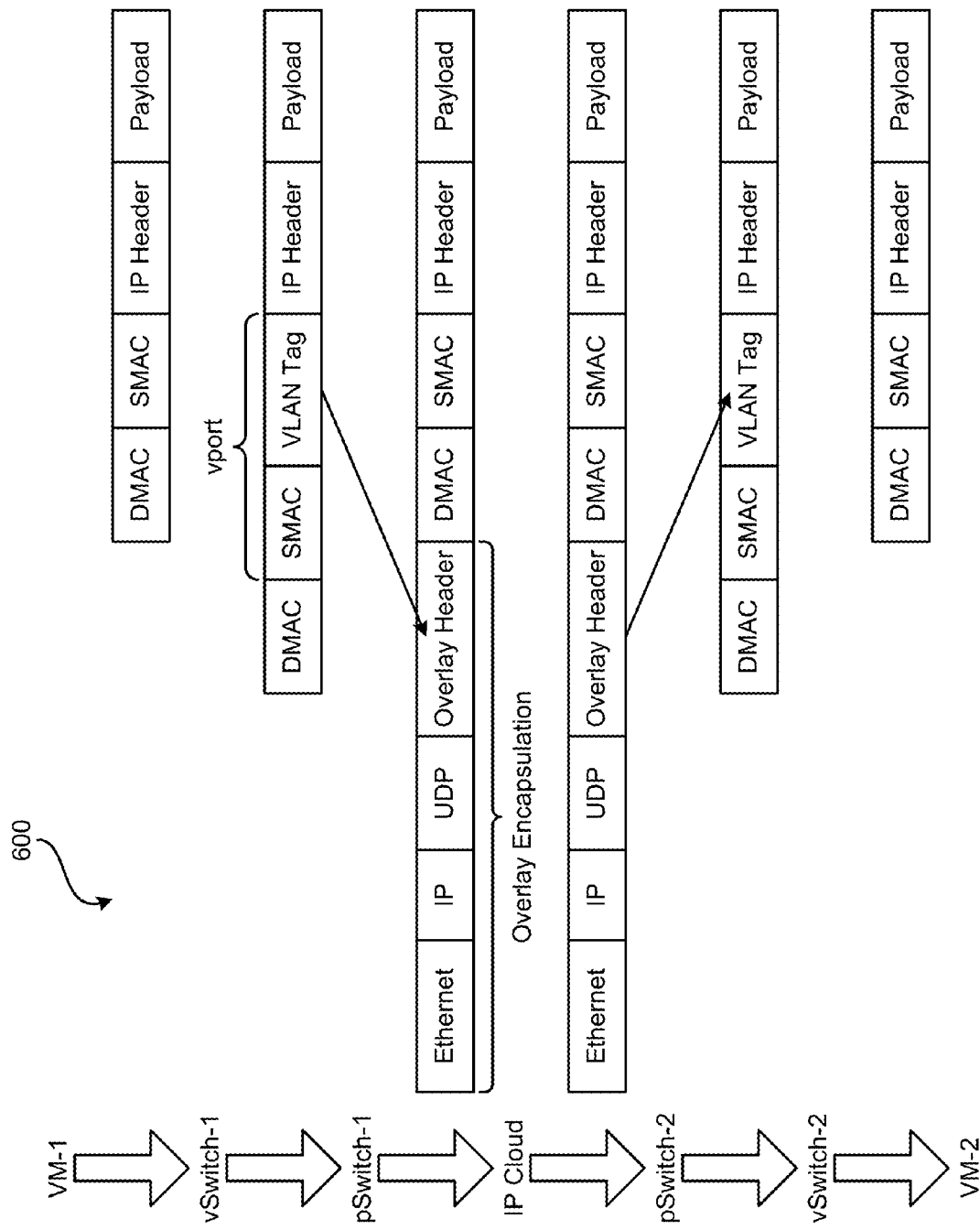
FIG. 6 shows packet flow from one VM to another VM within the same virtual network connected to vSwitches and pSwitches separated by an IP network, according to one embodiment.

FIG. 6 shows packet flow 600 from one VM to another VM within the same virtual overlay network connected to vSwitches and pSwitches separated by an IP network, according to one embodiment. As shown, the VLAN ID may be used as a proxy for the virtual network ID. In this way, there is an easy way to determine the virtual network identity of a packet when it is received by a pSwitch after being sent from a vSwitch. The pSwitch may then add the encapsulation necessary to transport the packet across the IP network, which includes mapping the VLAN ID to the virtual network ID carried in the overlay header. In fact, if the source and destination are connected to the same vSwitch or pSwitch, the tunnel does not even need to be established. Packets may be delivered via regular Layer-2 operation which is an advantage over conventional systems and architectures. According to one embodiment, a tunnel may be established only if the source and destination overlay pSwitches are separated by an IP network, as shown in FIG. 5. While the network switch ASIC operates the tunnel at wire speed, control plane mechanisms, such as address discovery protocol, may be implemented by the management processor on the switching system.

Figure 7:
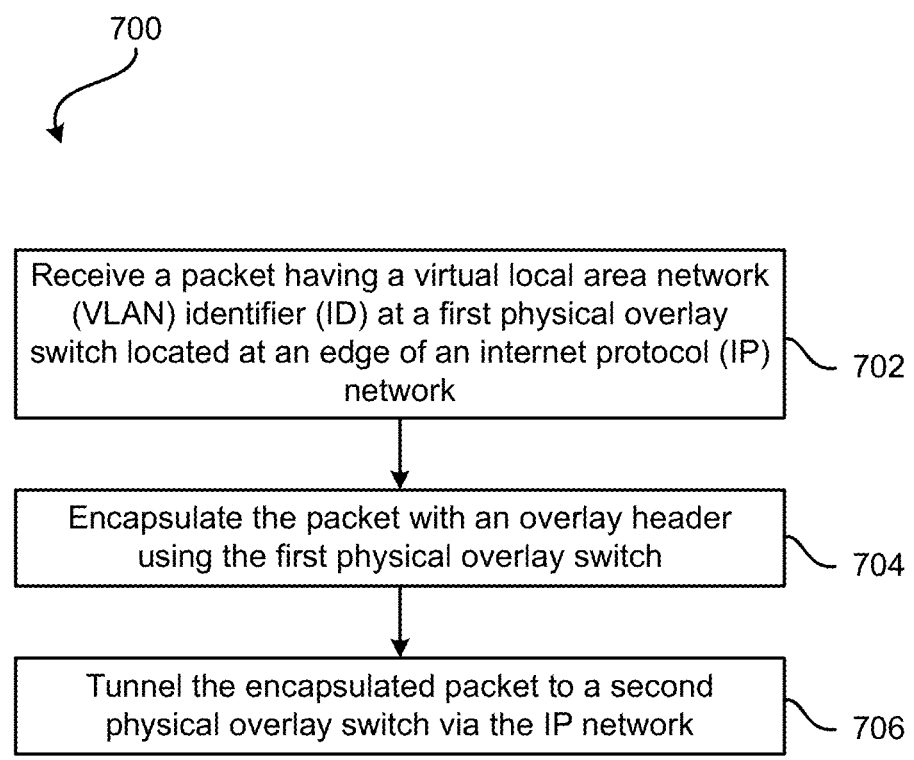
FIG. 7 is a flowchart of a method for providing an overlay network, according to one embodiment.

Now referring to FIG. 7, a flowchart of a method 700 for providing an overlay network is shown, according to one embodiment. The method 700 may be performed in accordance with the present invention in any of the environments depicted in FIGS. 1-3 and 6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in one embodiment, the method 700 may be partially or entirely performed by a physical overlay switch, a processor (such as a CPU, an ASIC, an FPGA, etc.), or computer program code embedded in a computer readable storage medium, in various approaches.

As shown in FIG. 7, method 700 may initiate with operation 702, where a packet having a VLAN ID is received at a first physical overlay switch located at an edge of an IP network.

The physical overlay switch may be any tangible, hardware switching device capable of providing overlay processing, such as encapsulating and de-encapsulating overlay packets having overlay headers encapsulating contents of the overlay packets, such as IP packets or other such data. In addition, the edge of the IP network may be any point in the IP network where overlay packets and IP packets/VLAN packets are received and/or sent, such as a virtual overlay network gateway, in one embodiment.

Furthermore, the IP network may be any typical network infrastructure including switches, routers, devices, etc., that provides communication between devices connected thereto, as would be understood by one of skill in the art.

In operation 704, the packet is encapsulated with an overlay header using the first physical overlay switch. In addition to the overlay header, and as explained in more detail in FIG. 6, encapsulating with the overlay header may include adding user datagram protocol (UDP), IP, and/or Ethernet identification and/or routing information, as known in the art.

Referring again to FIG. 7, in operation 706, the encapsulated packet is tunneled to a second physical overlay switch via the IP network. In this way, a packet received at the first physical overlay switch may be tunneled over to the second physical overlay switch without providing visibility to the inner packet contents.

In some further embodiments, the method 700 may also include receiving the encapsulated packet at the second physical overlay switch, de-encapsulating the overlay header from the encapsulated packet to create the packet having the VLAN ID, and sending the packet having the VLAN ID to a second virtual switch connected to the second physical overlay switch. In this way, the packet may be received at the second physical overlay switch, unpacked, and switched toward its intended destination port (which is accessible through the second virtual switch).

In further approaches, the packet may be switched to a destination port designated in the packet using the second virtual switch.

According to another embodiment, the method 700 may also include receiving the packet at a first virtual switch, encapsulating the packet with the VLAN ID using the first virtual switch, and switching the packet having the VLAN ID to the first physical overlay switch using the first virtual switch. In this way, the packet may originate at a first virtual machine (which may create the packet) and the packet may be sent to the first virtual switch using the first virtual machine. Then, the packet may be provided with a VLAN ID at the first virtual switch, and then forwarded on to the first physical overlay switch for overlay processing to tunnel through the IP network.

According to one approach, the first physical overlay switch and the second physical overlay switch may be top of rack switches, embedded blade switches, or a combination thereof, as known in the art.

In any approach, the first and second virtual switches may be controlled by different hypervisors, e.g., Hypervisors from different vendors, using different coding, having different functionality, etc.

According to another embodiment, the method 700 may be executed from a computer program product using a processor capable of executing such computer readable program code. For example, a computer program product for providing a virtual overlay network may include a computer readable storage medium having computer readable program code embodied therewith. The computer readable program code may comprise some or all of: computer readable program code configured for receiving a packet having a VLAN ID at a first physical overlay switch located at an edge of an IP network; computer readable program code configured for encapsulating the packet with an overlay header using the first physical overlay switch; and computer readable program code configured for tunneling the encapsulated packet to a second physical overlay switch via the IP network.

Furthermore, the computer program product may include computer readable program code configured for receiving the encapsulated packet at the second physical overlay switch; computer readable program code configured for de-encapsulating the overlay header from the encapsulated packet to create the packet having the VLAN ID; and computer readable program code configured for sending the packet having the VLAN ID to a second virtual switch connected to the second physical overlay switch.

In addition, the computer program product may include computer readable program code configured for switching the packet to a destination port using the second virtual switch.

In other approaches, the computer program product may comprise computer readable program code configured for receiving the packet at a first virtual switch; computer readable program code configured for encapsulating the packet with the VLAN ID using the first virtual switch; and computer readable program code configured for switching the packet having the VLAN ID to the first physical overlay network switch using the first virtual switch.

In another approach, the computer program product may comprise computer readable program code configured for creating the packet at a first virtual machine and computer readable program code configured for sending the packet to the first virtual switch using the first virtual machine.

In any approach, the first and second virtual switches may be controlled by different hypervisors, e.g., Hypervisors from different vendors, using different coding, having different functionality, etc.

While it is understood that the logic and computer program products described herein according to various embodiments may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

In addition, the various embodiments described herein may be provided to a client as a service from a service provider. In this way, the functionality described herein may be afforded to a client without the requirement of installing many new components. In one example, a Service Level Agreement (SLA) may be enacted which provides for the pre-arrangement of, and procurement of, resources for which a future requirement which is anticipated in accordance with an SLA.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method comprising:
    receiving a first packet having a first virtual local area network (VLAN) identifier (ID) directly from a first virtual switch operating in a first hypervisor domain using a first physical overlay switch located at an edge of an internet protocol (IP) network;
    encapsulating the first packet with an overlay header;
    tunneling the first encapsulated packet via Layer-3 operations across the IP network to a second physical overlay switch in response to a determination that a source of the packet is physically separated from a destination of the packet by the IP network, the second physical overlay switch being connected to one or more second virtual switches operating in a second hypervisor domain;
    receiving a second encapsulated packet having a second overlay header from the second physical overlay switch;
    de-encapsulating the second encapsulated packet to create a second packet having a second VLAN ID;
    the first physical overlay switch creating the second VLAN ID based at least partially on the second overlay header; and
    sending the second packet having the second VLAN ID directly to the first virtual switch operating in the first hypervisor domain.

2. The method as recited in claim 1, wherein the first physical overlay switch is a top of rack switch.

3. The method as recited in claim 1, wherein the first physical overlay switch is an embedded blade switch.

4. The method as recited in claim 1, wherein the first hypervisor domain is associated with a first hypervisor that is unable to communicate with a second hypervisor associated with the second hypervisor domain, and wherein the first hypervisor is of a different type than the second hypervisor.

5. The method as recited in claim 1, wherein the source of the packet is a first virtual machine (VM) operating in the first hypervisor domain.

6. The method as recited in claim 1, further comprising the first physical overlay switch creating the overlay header based at least partially on the VLAN ID.

7. A method, comprising:
    a first virtual switch sending a first packet having a first virtual local area network (VLAN) identifier (ID) directly to a first physical overlay switch located at an edge of an internet protocol (IP) network, the first virtual switch operating in a first hypervisor domain;
    the first virtual switch receiving a second packet having a second VLAN ID from the first physical overlay switch, the second packet being sent by a second virtual switch operating in a second hypervisor domain to the first physical overlay switch;
    the first virtual switch removing the second VLAN ID from the second packet; and
    the first virtual switch switching the second packet to a destination port designated in the second packet,
    wherein the first hypervisor domain is associated with a first hypervisor that is unable to communicate with a second hypervisor associated with the second hypervisor domain.

8. The method as recited in claim 7, further comprising:
    the first virtual switch receiving the first packet from a first source device connected to the first virtual switch; and
    the first virtual switch encapsulating the first packet with the first VLAN ID.

9. The method as recited in claim 8, wherein the source of the packet is a first virtual machine (VM) operating in the first hypervisor domain.

10. The method as recited in claim 7, wherein the first physical overlay switch is a top of rack switch.

11. The method as recited in claim 7, wherein the first physical overlay switch is an embedded blade switch.

12. The method as recited in claim 7, wherein the first physical overlay switch is a top of rack switch that is an embedded blade switch.

13. A computer program product comprising a computer readable storage medium having program instructions embodied therewith, wherein the computer readable storage medium is not a transitory signal per se, the embedded program instructions readable/executable by a processor of a first physical overlay switch to:
    receive, by the processor, a first packet having a first virtual local area network (VLAN) identifier (ID) directly from a first virtual switch operating in a first hypervisor domain, the first physical overlay switch being located at an edge of an internet protocol (IP) network;
    encapsulate, by the processor, the first packet with an overlay header;
    tunnel, by the processor, the first encapsulated packet via Layer-3 operations across the IP network to a second physical overlay switch in response to a determination that a source of the packet is physically separated from a destination of the packet by the IP network, the second physical overlay switch being connected to one or more second virtual switches operating in a second hypervisor domain;
    receive, by the processor, a second encapsulated packet having a second overlay header from the second physical overlay switch;
    de-encapsulate, by the processor, the second encapsulated packet to create a second packet having a second VLAN ID;
    create the second VLAN ID, by the processor, based at least partially on the second overlay header; and
    send, by the processor, the second packet having the second VLAN ID directly to the first virtual switch operating in the first hypervisor domain.

14. The computer program product as recited in claim 13, wherein the first physical overlay switch is a top of rack switch.

15. The computer program product as recited in claim 13, wherein the first physical overlay switch is an embedded blade switch.

16. The computer program product as recited in claim 13, wherein the first hypervisor domain is associated with a first hypervisor that is unable to communicate with a second hypervisor associated with the second hypervisor domain, and wherein the first hypervisor is of a different type than the second hypervisor.

17. The computer program product as recited in claim 13, wherein the source of the packet is a first virtual machine (VM) operating in the first hypervisor domain.

18. The computer program product as recited in claim 13, wherein the embedded program instructions are further readable/executable by the processor to create, by the processor, the overlay header based at least partially on the VLAN ID.

* * * * *